H. B. MORRISON.
Stove Pipe.
No. 83,401.  Patented Oct. 27, 1868.
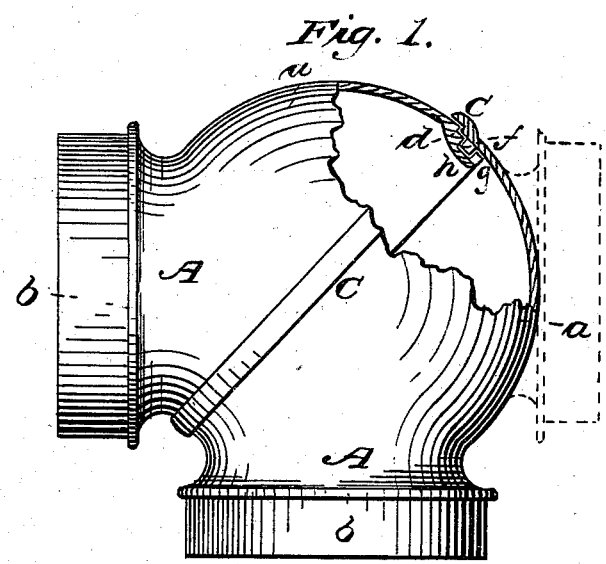
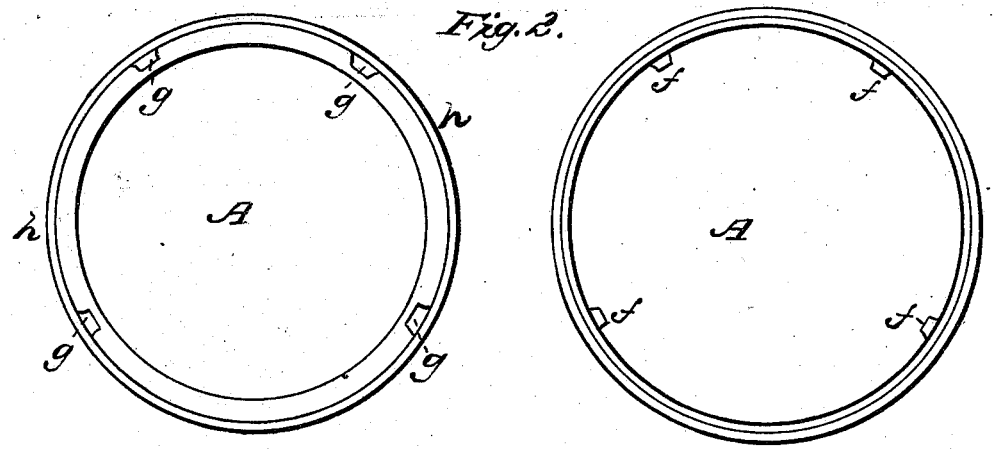

HIRAM B. MORRISON, OF LE ROY, NEW YORK.

Letters Patent No. 83,401, dated October 27, 1868.

ELBOW-JOINT FOR STOVE-PIPES.

The Schedule referred to in these Letters Patent and making part of the same.

*To all whom it may concern:*

Be it known that I, HIRAM B. MORRISON, of Le Roy, in the county of Genesee, and State of New York, have invented a certain new and useful Improvement in Elbow-Joints for Stove and Hot-Air Pipes; and I do hereby declare that the following is a full and exact description thereof, reference being had to the accompanying drawings, making part of this specification.

Figure 1 is an elevation of my improved device, with a part in section, to show the joint proper.

Figure 2, a view of the parts, separated, showing the joint-arrangement.

Like letters of reference indicate corresponding parts in both figures.

My invention consists in constructing the entire elbow of cast-iron, and providing a joint which will allow the arms to adjust to any position between a right angle and straight length.

It further consists in the special construction and arrangement of the joint proper, whereby the parts are easily separated.

In the drawings—

A A indicate the two arms, which constitute the entire elbow, being composed of cast-iron half bulbs, $a$ $a$, which, when joined together, form a globe, and having flanges $b\ b$, for the connection of the straight sections of pipe.

The angular joint between these parts is formed by a tongue, $c$, of one part, and groove $d$ of the other, which overlap in such a manner as to make a close fit, and effectually confine the smoke; and the connection of the joint is made by means of three or more lugs, $f$ $f f$, of the one part striking into three or more notches, $g\ g\ g$, of the other part, and then turning in a groove, $h$, which holds them in place, except when in coincidence with the notches.

Ordinary stove-pipe elbows are made of sections of sheet-metal pipes, with the ends cut angularly, and seamed rigidly together. A cast-iron coupling-flange, of narrow width, to which the angular ends of the pipe are riveted, has also been used.

In contradistinction to these plans, mine consists in making the whole elbow of cast-iron, and not riveting the ends of the pipe thereto, but simply slipping them on the square flanges $b\ b$, in the same manner as they couple together.

By this construction, also, I am enabled, by reason of the loose angular joint described, to turn the arms A A to any position from the right angle (in black lines) to the straight length, (in red lines;) or in other words, I can make them assume a right-angled position, any obtuse-angled position, or a straight position.

In adjusting stove-pipe, it is frequently necessary to use an obtuse angle; and, in such cases, it has been heretofore necessary to make an elbow for the special purpose.

As a straight length, the device is of frequent use in filling out small distances, and may be desirable to give an ornamental form to the pipe, by placing at regular intervals apart.

The coupling, by means of the lugs $f$, notches $g$, and annular groove $h$, enables this turning-action to be performed, and at the same time holds the parts of the elbow in place at all times, except when turned to a specified position, when they unlock. The overlapping tongue and groove $c\ d$ are also of importance in making a close joint.

What I claim as my invention, and desire to secure by Letters Patent, is—

1. A cast-iron elbow, for stove and hot-air pipes, made entire, with a suitable connecting and disconnecting-joint, substantially as set forth.

2. An elbow, for stove and hot-air pipes, in which the joint is so formed and connected that the arms or ends of said elbow may be turned to any position, from a right angle to a straight length, as described.

3. The combination and arrangement of the lugs F, notches $g$, groove $h$, and tongue and groove $c\ d$, the whole constituting the joint, as herein described.

In witness whereof, I have hereunto signed my name in the presence of two subscribing witnesses.

HIRAM B. MORRISON.

Witnesses:
J. A. DAVIS,
R. F. OSGOOD.